3,514,437
ISOPRENE POLYMERIZATION
James Neil Henderson, Hudson, Ohio, assignor to The Goodyear Tire & Rubber Company, Akron, Ohio, a corporation of Ohio
No Drawing. Filed Feb. 2, 1967, Ser. No. 613,455
Int. Cl. C08d 3/10
U.S. Cl. 260—94.3     8 Claims

ABSTRACT OF THE DISCLOSURE

A method useful for the polymerization of isoprene is disclosed. The method consists of dissolving isoprene in an aliphatic solvent and bringing this mixture into contact with a three component catalyst which comprises a mixture of (a) an organoaluminum halide of the formula $RAlX_2$ where R is a hydrocarbon radical and X is a halogen, (b) a tungsten salt, preferably a halide salt, and (c) a compound of the formula R—Y—H where R is a hydrocarbon or a thiol or hydroxyl substituted hydrocarbon radical or hydrogen and Y is either oxygen or sulfur. When analyzed by infrared techniques, a polyisoprene produced by the method was indicated to have double bonds proportionally of the following types: cis 1,4 about 50%; trans 1,4 about 33%; 3,4 about 14%; and 1,2 about 3%.

---

This invention is directed to a method for the polymerization of isoprene. More specifically, it is directed to the polymerization of isoprene by a 3-component catalyst system.

According to the invention, isoprene is polymerized while dissolved in an aliphatic hydrocarbon solvent by bringing the isoprene in contact with a three component catalyst system comprising (A) at least one compound of the formula $RAlX_2$ wherein R is selected from the group consisting of alkyl (including cycloalkyl), aryl, alkaryl, aralkyl and alkenyl radicals; X is a halogen selected from the group consisting of chlorine, bromine, fluorine and iodine and (B) a tungsten halide salt and (C) at least one compound of the formula R—Y—H wherein Y is selected from the group consisting of oxygen and sulfur and R is selected from the group consisting of alkyl, aryl, aralkyl, alkaryl, alkenyl radicals, hydrogen and radicals of alkyl, aryl, aralkyl, alkaryl and alkenyl radicals wherein at least one hydrogen is substituted by at least one thiol (SH) or hydroxyl (OH) group.

Thus, the first or (A) component of the catalyst system describes organoaluminum dihalides representative of which are ethyl aluminum sesquichlorides, iodides, chlorides and bromides; ethyl aluminum dichloride, ethyl aluminum dibromide; ethyl aluminum difluoride, ethyl aluminum diiodide, propyl aluminum dichloride, propyl aluminum diiodide, isobutyl aluminum dibromide, phenyl aluminum dibromide, phenyl aluminum diiodide, tolyl aluminum diiodide, benzyl aluminum dibromide, phenyl aluminum dichloride, benzyl aluminum dichloride, isopropyl aluminum dihalide and 2-butenyl aluminum dihalide. The preferred component is an alkyl aluminum halide, an example of which is ethyl aluminum dichloride.

The second or (B) component of the catalyst system employed in this invention is a tungsten halide salt representative examples of which are tungsten hexaiodide, tungsten hexachloride, tungsten hexabromide, tungsten hexafluoride, tungsten oxytetrabromide, tungsten oxytetraiodide and tungsten oxytetrachloride. The preferred salt employed is tungsten hexachloride.

The third or (C) component of the catalyst system responds to the formula R—Y—H where Y is either oxygen or sulfur and R is a hydrocarbon radical, a thiol or hydroxyl substituted hydrocarbon radical, or hydrogen.

The compounds defined by R—Y—H include a number of types of compounds. R—Y—H defines water (HOH), hydrogen sulfide (HSH), both saturated and unsaturated alcohols (ROH), saturated and unsaturated mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols such as methanol, ethanol, isopropanol, tertiarybutyl alcohols, amyl alcohol, benzyl, alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl, and the like mercaptans, allyl mercaptan, thiophenol, 4-methyl-thiophenol, 4-mercaptophenol; the hydroperoxides such as cumyl hydroperoxide, tertiary butyl peroxide; the hydrodisulfides such as cumyl hydrodisulfide, ti-butyl hydrodisulfide; the polyalcohols such as 1,3-propane diol, ethylene glycol, glycerol and similar polyglycerols and polyglycol; catechol, resorcinol, hydroquinone, pyrogallol; the polymercaptans such as 1,3-propane dithiol, 1,4-dithio benzene; the hydroxymercaptans or thioalcohols such as ethane-2-ol-1-thiol, 1-hydroxy-4-thio benzene.

One of the unusual and distinguishing features of this invention is that the compounds of the formula R—Y—H, wherein R and Y have been previously defined, depending on the particular organo-metallic compound and the particular tungsten salt chosen and on the particular R—Y—H compound chosen, when employed in fairly substantial amounts are known to reduce the activity of the catalysts of this invention. (For instance, such materials as alcohols have been utilized as shortstoppers in the polymerization of conjugated diolefins with catalysts prepared by organometallic compounds and metal salts of Group IVb metals.) Since the instant invention contemplates the use of organoaluminum dihalides in combination with tungsten salts and various oxygen- and sulfur-containing compounds, and since various factors or considerations will influence the optimum range of the three catalyst components in relation to each other, the optimum molar ratios of the three components cannot be readily set forth. However, by following the various teachings found elsewhere and particularly in the examples of this application, those skilled in the art can readily determine the optimum molar ratio of the three catalyst components to each other. Obviously, if one employs the oxygen- or sulfur-containing compound, or as is designated above, component C in relatively large amounts, the activity of the catalyst will be reduced considerably or even destroyed.

It has been found that good results are obtained when the molar relationship between the three catalyst components, A, B, and C, are within a molar ratio of $B/C$ ranging from about 0.3/1 to at least about 20/1 and the molar ratio of $A/B$ is within the range of about 0.5/1 to at least 15/1. More preferred ratios are $B/C$ of 0.5/1 to 5/1 and $A/B$ of 0.5/1 to 8/1. Still more preferred ratios are $B/C$ of 1/1 to 2/1 and $A/B$ of 0.75/1 to 5/1.

Also for the reason that the R—Y—H compound can cause reduced activity in the catalyst system the three catalyst components should be mixed in a certain specific order of addition. The simultaneous mixing of all three components leads to a catalyst of good activity. However, care should be taken not to allow the third or C component to stand in contact with the A component in the absence of the B component. As has been indicated before, materials such as alcohol react violently with the organoaluminum dihalides. Thus, it is preferred that components A and B be mixed prior to the incorporation of C or C and B be mixed prior to the incorporation of A. Those skilled in the art will realize the proper order of addition to form the most active catalyst.

The catalyst employed in this invention are prepared by mixing the components by known techniques. Each component is usually dissolved in a portion of solvent such as aliphatic or aromatic hydrocarbons and then mixed as solutions. The catalyst may be prepared by "preformed" or an "in situ" techniques. By the "preformed" method is meant that the catalyst components are mixed and the active catalyst formed in the absence of the isoprene. The "in situ" method is meant to include the method where the catalyst components are added individually to the reaction vessel containing the isoprene.

In general, isoprene is polymerized in accordance with the invention in the presence of the aforementioned catalyst system while the isoprene is dissolved in an inert solvent or diluent. The examples of representative solvents are pentane, hexane, heptane, octane and cyclohexane. When a solvent is employed the solvent/isoprene volume ratio is not critical but it is usually preferred that this ratio range between 3/1 and about 6/1. Both batch and continuous polymerization may be employed.

The temperature employed in the polymerizations of this invention may vary broadly between extremely low temperatures of, for instance, −20° C. or extremely high temperatures such as 100° C. However, it is usually more convenient to employ temperatures that range from about 10 to about 50° C.

The practice of this invention is further illustrated by reference to the following examples by which all parts and percentages are by weight unless otherwise indicated. These examples are intended to be representative rather than restrictive of the scope of the invention.

EXAMPLE I

Isoprene (11 grams) was dissolved in 33 grams of n-pentane. To this mixture was added sufficient amounts of first a mixture of tungsten hexachloride and ethyl alcohol, and then ethyl aluminum dichloride, each being dissolved in one ml or less of toluene in order to give a mole ratio of Al/W/ROH of 2/1/1 and 0.033 parts of total catalyst per hundred of monomer. The polymerization was conducted at 50° C. temperatures for 40 hours. After addition of 5 ml of a solution containing 0.75 grams of tetraethylene pentamine and .075 grams of p-phenylene diamine antioxidant in benzene, the polymeric product was recoverd from the reaction mixture by mixing with an equal volume of methanol and washing and drying the precipitate. The dried weight of rubber was 6.1 grams.

EXAMPLE II

Several polymerizations were performed in a manner similar to that described in Example I. As a result of these polymerizations, polyisoprenes which appear to be similar to that of Example I were obtained. When the dilute solution viscosities of these polymers were determined, the results ranged from about 1.0 to about 1.5 dl./g. at 30° C. in benzene.

EXAMPLE III

Another experiment was conducted similar to that of Example I. The polyisoprene obtained was analyzed using infrared techniques. The results indicated that the double bonds were proportionately of the following types:

| | Percent |
|---|---|
| Cis-1,4 | 50 |
| Trans-1,4 | 33 |
| 3,4 | 14 |
| 1,2 | 3 |

The infrared analysis also indicated that the polymer had 94% of the total unsaturation of natural rubber.

While certain representative embodiments and details have been shown for the purpose of illustrating the invention, it will be apparent to those skilled in this art that various changes and modifications may be made therein without departing from the spirit or scope of the invention.

What is claimed is:
1. The method of polymerizing isoprene which comprises contacting isoprene under polymerization conditions with a catalytic amount of a three component catalyst system comprising (A) at least one compound of the formula $RAlX_2$ wherein R is selected from the group consisting of alkyl (including cycloalkyl), aryl, alkaryl, aralkyl and alkenyl radicals, X is a halogen selected from the group consisting of chlorine, bromine, iodine and fluorine, and Al is aluminum; (B) a tungsten halide salt and (C) at least one compound of the formula R—Y—H wherein Y is selected from the group consisting of oxygen and sulfur and R is selected from the group consisting of alkyl, aryl, aralkyl, alkaryl and alkenyl radicals, hydrogen and radicals of alkyl, aryl, aralkyl, and alkaryl and alkenyl radicals wherein at least one hydrogen of such radicals is substituted by at least one radical from the group of thiol (SH) and hydroxyl (OH) radicals.

2. A method according to claim 1 in which the polymerization is conducted as a solution polymerization in aliphatic hydrocarbon solvents.

3. A method according to claim 1 in which the tungsten halide salt is tungsten hexachloride.

4. A method according to claim 1 in which the compound of the formula $RAlX_2$ is ethyl aluminum dichloride.

5. A method according to claim 1 in which the compound of the formula R—Y—H is ethyl alcohol.

6. A method according to claim 1 in which the catalyst components are employed in amounts so that the molar ratio of B/C ranges from about 0.3/1 to about 20/1 and the molar ratio of A/B ranges from about 0.5/1 to about 15/1.

7. The method according to claim 1 in which the catalyst components are employed in amounts so that the molar ratio of B/C ranges from about 0.5/1 to 5/1 and the molar ratio of A/B ranges from about 0.5/1 to about 8/1.

8. The method according to claim 7 in which A is represented by ethyl aluminum dichloride, B is represented by tungsten hexachloride, and C is represented by ethyl alcohol.

References Cited

UNITED STATES PATENTS

| 3,288,769 | 11/1966 | Cooper et al. | 260—88.2 |
| 3,328,376 | 6/1967 | Bernemann et al. | 260—94.3 |

FOREIGN PATENTS 215,043   11/1956   Australia.

OTHER REFERENCES

Gippin, Polymerization of Butadiene with Alkyl Aluminum and Cobalt Chloride ACS. Div. of Petroleum Chem. Preprints vol. 6, No. 4, September 1961 (pp. A-25–A-39 relied on).

JOSEPH L. SCHOFER, Primary Examiner

R. A. GAITHER, Assistant Examiner